(12) United States Patent
Sugimori et al.

(10) Patent No.: US 9,831,806 B2
(45) Date of Patent: Nov. 28, 2017

(54) INVERTER APPARATUS

(71) Applicant: AISIN SEIKI KABUSHIKI KAISHA, Kariya-shi, Aichi-ken (JP)

(72) Inventors: Kazuki Sugimori, Hekinan (JP); Takeru Tsuji, Obu (JP); Shinichi Tagawa, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/851,036

(22) Filed: Sep. 11, 2015

(65) Prior Publication Data

US 2016/0079890 A1    Mar. 17, 2016

(30) Foreign Application Priority Data

Sep. 12, 2014    (JP) .................................. 2014-186354

(51) Int. Cl.
*H02K 29/08*    (2006.01)
*H02P 6/12*    (2006.01)
*H02P 29/024*    (2016.01)

(52) U.S. Cl.
CPC ............ *H02P 6/12* (2013.01); *H02P 29/0241* (2016.02)

(58) Field of Classification Search
USPC .................................. 318/400.38, 567, 498
See application file for complete search history.

(56) References Cited

U.S. PATENT DOCUMENTS

| | | | |
|---|---|---|---|
| 2003/0057903 A1* | 3/2003 | Desbiolles | B62D 15/02 318/254.1 |
| 2008/0067964 A1* | 3/2008 | Maeda | H02P 6/185 318/474 |
| 2009/0009920 A1 | 1/2009 | Yamada | |
| 2009/0121664 A1* | 5/2009 | Sugimoto | E05F 15/697 318/400.09 |

(Continued)

FOREIGN PATENT DOCUMENTS

| | | | |
|---|---|---|---|
| DE | 10249568 A1 * | 5/2004 | G01R 31/02 |
| JP | 8-163889 A | 6/1996 | |

OTHER PUBLICATIONS

Communication dated Jan. 28, 2016, issued by the European Patent Office in corresponding European Application No. 15184652.4.

*Primary Examiner* — Jorge L Carrasquillo
(74) *Attorney, Agent, or Firm* — Sughrue Mion, PLLC (57) ABSTRACT

An inverter apparatus includes: an inverter including three high-voltage side switching elements and three low-voltage side switching elements respectively provided in three phases one by one, and driving a three-phase brushless motor; an opening and closing control unit performing controlling so as to cause an electrical angle of the motor to pass through an angle corresponding to a first combination, to rotate twice by 120° each time to one side in a rotary direction, and to rotate once by 120° to the other side in the rotary direction thereafter, by sequentially closing four combinations each of which is formed with one among the high-voltage side switching elements and one among the low-voltage side switching elements; and a detection unit detecting a conduction state of a circuit including the closed high-voltage side and low-voltage side switching elements, wherein all the high-voltage side and low-voltage side switching elements are closed at least once in the four combinations.

2 Claims, 5 Drawing Sheets

| | C1 | C2 | C3 | C4(C2) |
|---|---|---|---|---|
| SHU | ON | OFF | OFF | OFF |
| SHV | OFF | ON | OFF | ON |
| SHW | OFF | OFF | ON | OFF |
| SLU | OFF | OFF | ON | OFF |
| SLV | ON | OFF | OFF | OFF |
| SLW | OFF | ON | OFF | ON |
| CURRENT | U→V | V→W | W→U | V→W |
| ELECTRICAL ANGLE | P1 | P2(P0) | P3 | P4(P0) |

(56) References Cited

U.S. PATENT DOCUMENTS

| | | | | |
|---|---|---|---|---|
| 2010/0283416 A1* | 11/2010 | Onishi | .................... | H02P 6/28 318/400.09 |
| 2013/0264987 A1* | 10/2013 | Uchida | ................ | H02K 7/145 318/495 |
| 2014/0062360 A1* | 3/2014 | Muramatsu | ............... | H02P 6/14 318/400.14 |
| 2014/0139153 A1* | 5/2014 | Aoki | ....................... | H02P 6/22 318/400.1 |

* cited by examiner

|  | C1 | C2 | C3 | C4(C2) |
|---|---|---|---|---|
| SHU | ON | OFF | OFF | OFF |
| SHV | OFF | ON | OFF | ON |
| SHW | OFF | OFF | ON | OFF |
| SLU | OFF | OFF | ON | OFF |
| SLV | ON | OFF | OFF | OFF |
| SLW | OFF | ON | OFF | ON |
| CURRENT | U→V | V→W | W→U | V→W |
| ELECTRICAL ANGLE | P1 | P2(P0) | P3 | P4(P0) |

INVERTER APPARATUS

CROSS REFERENCE TO RELATED APPLICATIONS

This application is based on and claims priority under 35 U.S.C. §119 to Japanese Patent Application 2014-186354, filed on Sep. 12, 2014, the entire contents of which are incorporated herein by reference.

TECHNICAL FIELD

An embodiment of this disclosure relates to an inverter apparatus.

BACKGROUND DISCUSSION

In the related art, there is a known inverter apparatus having a disconnection detection function.
JP 08-163889A is an example of related art.

SUMMARY

It is useful if an inverter apparatus having a new less-inconvenient configuration including an examination function of a conduction state can be obtained, for example.

An inverter apparatus according to an aspect of this disclosure includes, for example, an inverter that includes three high-voltage side switching elements and three low-voltage side switching elements respectively provided in three phases one by one, and drives a three-phase brushless motor; an opening and closing control unit that performs controlling so as to cause an electrical angle of the three-phase brushless motor to pass through an angle corresponding to a first combination, to rotate twice by 120° each time to one side in a rotary direction, and to rotate once by 120° to the other side in the rotary direction thereafter, by sequentially closing four combinations each of which is formed with one among the three high-voltage side switching elements and one among the three low-voltage side switching elements; and a detection unit that detects a conduction state of a circuit including the closed high-voltage side switching element and the closed low-voltage side switching element, in which all of the three high-voltage side switching elements and the three low-voltage side switching elements are closed at least once in the four combinations. Therefore, for example, misalignment of a rotary angle of a rotor is unlikely to occur before and after a series of processing for examining the conduction state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of this disclosure will be disclosed. The below-described configuration of the embodiment, and an action, a result, and an effect acquired by the configuration are examples. This disclosure can also be realized by a configuration other than the configuration disclosed in the following embodiment. According to this disclosure, it is possible to obtain at least one effect among various effects which can be obtained by the configuration and derivative effects.

Figure 1:
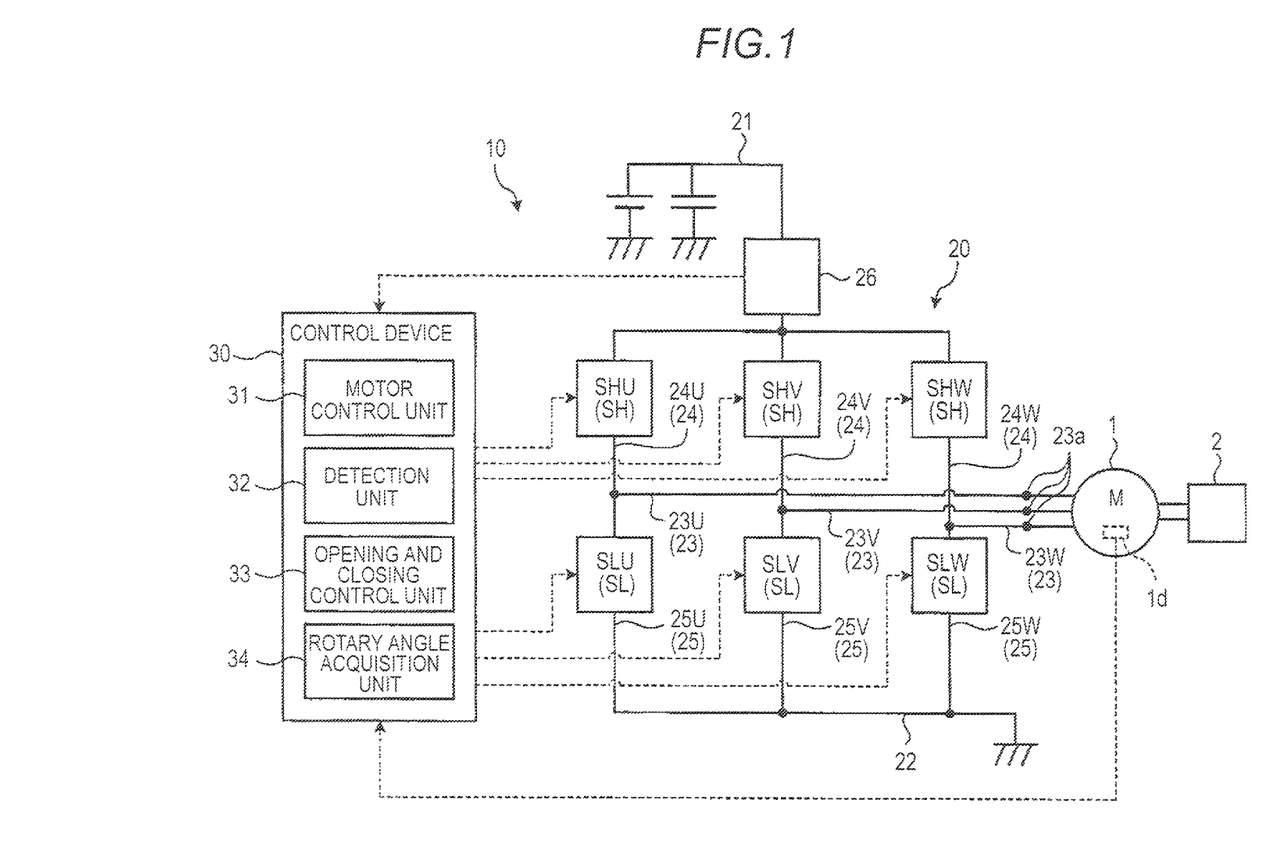
FIG. 1 is a schematic and exemplary configurational diagram of an inverter apparatus and a motor according to an embodiment.

As illustrated in FIG. 1, a motor 1 is driven by an inverter apparatus 10 which inverts a direct current into a three-phase alternating current. The motor 1 includes a stator (not illustrated) and a rotor. The stator includes a three-phase coil (not illustrated) which generates a rotary magnetic field. In other words, the motor 1 is a three-phase brushless motor. The motor 1 is a drive source of a movable section 2, that is, an actuator. In other words, a position, an angle, a rotary speed, and the like of the movable section 2 can be controlled by controlling the motor 1.

The inverter apparatus 10 includes an inverter 20 and a control device 30. The inverter 20 includes a high-voltage cable 21, a low-voltage cable 22, an output cable 23, a high-voltage side arm 24, a low-voltage side arm 25, and the like. Three of the output cables 23 supply alternating current power to the motor 1 in three phases, that is, a U-phase, a V-phase, and a W-phase. Each of the output cables 23 (23U, 23V, and 23W) is connected to the high-voltage cable 21 via each of the high-voltage side arms 24 (24U, 24V, and 24W), and is connected to the low-voltage cable 22 via each of the low-voltage side arms 25 (25U, 25V, and 25W). The high-voltage side arms 24 (24U, 24V, and 24W) are respectively provided with high-voltage side switching elements SH (SHU, SHV, and SHW) for switching opening and closing of each of the high-voltage side arms 24, and the low-voltage side arms 25 (25U, 25V, and 25W) are respectively provided with low-voltage side switching elements SL (SLU, SLV, and SLW) for switching opening and closing of each of the low-voltage side arms 25. As opening and closing of the high-voltage side switching elements SH and the low-voltage side switching elements SL are controlled, the three output cables 23 output three-phase alternating current power.

The high-voltage side switching elements SH and the low-voltage side switching elements SL are power metal-oxide-semiconductor field-effect transistors (MOSFET) or insulated gate bipolar transistors (IGBT), for example.

Each output cable 23 is electrically connected to a wire of each phase of the motor 1 via a terminal 23a. The motor 1 is provided with a plurality of coils which respectively correspond to the phases. The coils are configured to be formed by winding the wires which are electrically connected to the output cables 23 or the wires which are electrically connected to the aforementioned wires around teeth of the stator. The wires configured to respectively form the coils of the phases are electrically connected to one another in the motor 1 through delta connection or star connection.

For example, the control device 30 includes a motor control unit 31, a detection unit 32, and an opening and closing control unit 33. The motor control unit 31 controls rotations of the motor 1 by controlling opening and closing of the high-voltage side switching elements SH and the low-voltage side switching elements SL. The detection unit 32 detects a conduction state of a circuit which is configured to form the inverter 20. The opening and closing control unit 33 controls opening and closing of the high-voltage side switching elements SH and the low-voltage side switching elements SL during detection performed by the detection unit 32. The control device 30 is an ECU, for example, and includes a CPU, a drive circuit, a ROM, a RAM, a flash memory, and the like. The CPU executes computation processing in accordance with a program which is installed and loaded, thereby controlling rotations of the motor 1, detecting the conduction state, controlling opening and closing of the high-voltage side switching elements SH and the low-voltage side switching elements SL during detection of the conduction state, and controlling each unit related to controlling thereof. The motor control unit 31 can also be referred to as a rotation control unit.

As described above, each of the output cables 23 of the phases is electrically connected to one another in the motor 1, thereby forming a circuit in which currents flow via the high-voltage cable 21, the high-voltage side arm 24 provided with the closed high-voltage side switching element SH, the output cable 23, the low-voltage side arm 25 provided with the closed low-voltage side switching element SL, and the low-voltage cable 22 by closing one among the three high-voltage side switching elements SH, closing one among the three low-voltage side switching elements SL, and opening other high-voltage side switching elements SH and low-voltage side switching elements SL. As an example, when the high-voltage side switching element SHU of the U-phase and the low-voltage side switching element SLV of the V-phase are closed, a circuit in which currents flow via the high-voltage cable 21, the high-voltage side arm 24U provided with the closed high-voltage side switching element SHU of the U-phase, the output cable 23U of the U-phase, the output cable 23V of the V-phase, the low-voltage side arm 25V provided with the closed low-voltage side switching element SLV of the V-phase, and the low-voltage cable 22 is formed. In the embodiment, in a state where the motor control unit 31 is not controlling rotations of the motor 1, the opening and closing control unit 33 sequentially forms a configuration of a circuit including at least three combinations different from that of one closed high-voltage side switching element SH and one closed low-voltage side switching element SL, and the detection unit 32 examines the conduction state of the circuit. Thus, all the high-voltage side switching element SH and the low-voltage side switching element SL can be examined. For example, when the motor 1 is used for driving the movable section 2 of a system which is mounted in a vehicle, the opening and closing control unit 33 and the detection unit 32 can execute processing in accordance with an actuation operation of an ignition key, a button, or the like of a vehicle, that is, every time performing an actuation operation.

The inverter 20 is provided with a sensor 26, that is, a current sensor or the like for detecting the conduction state of the circuit. For example, the current sensor serving as the sensor 26 can detect magnitude of a current value corresponding to an applied voltage value. The detection unit 32 can detect the conduction state based on a detection result of the sensor 26. For example, the detection unit 32 detects a conduction failure state when the detection result such as the current value obtained by the sensor 26 is equal to or less than a predetermined threshold value. For example, when the conduction failure state is detected, the detection unit 32 outputs a signal or performs controlling so as to operate an alarm section such as a lamp. In the embodiment, for example, the sensor 26 is provided between the three high-voltage side arms 24 and the high-voltage cable 21. The sensor 26 may be provided in each of the high-voltage side arms 24, may be provided in each of the output cables 23, may be provided between the three low-voltage side arms 25 and the low-voltage cable 22, or may be provided in each of the low-voltage side arms 25. The sensor 26 does not need to be the current sensor.

When the opening and closing control unit 33 forms a configuration of the circuit in which a plurality of combinations different from that of the one high-voltage side switching element SH and the one low-voltage side switching element SL are sequentially switched, power is supplied to one or two phases of the motor 1 each stage of switching. Accordingly, an electrical angle of the motor 1 changes multiple times in stages. The rotor also rotates due to action of an electromagnet of the stator and a permanent magnet of the rotor in accordance with changes of the electrical angle of the motor 1, that is, rotations of the electrical angle. It is not preferable that the position or the angle of the movable section 2 significantly changes, or the relative position or the relative angle between the rotor and the movable section 2 significantly changes due to rotations of the rotor while being not controlled by the motor control unit 31. Therefore, in the embodiment, the opening and closing control unit 33 sequentially forms a configuration of the circuit including four combinations different from that of the one high-voltage side switching element SH and the one low-voltage side switching element SL so as to satisfy the following cases 1 and 2.

Figure 2:
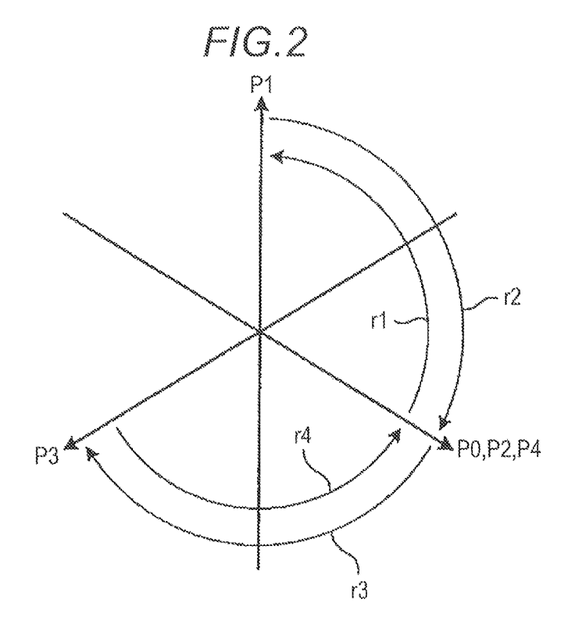
FIG. 2 is an explanatory diagram exemplifying changes in an electrical angle of the motor during examination of a conduction state performed by the inverter apparatus according to the embodiment.

1. As illustrated in FIG. 2, after the electrical angle of the motor 1 is positioned at an angle P1 corresponding to a predetermined first combination, the electrical angle of the motor 1 is set to move by 120° each time to one side in a rotary direction due to a second combination and a third combination, and to move by 120° each time to the other side in the rotary direction due to a fourth combination. In the example of FIG. 2, the one side in the rotary direction is set to the clockwise direction. An angle P2 corresponding to the second combination is a position away from the angle P1 by 120° to the one side in the rotary direction. An angle P3 corresponding to the third combination is a position away from the angle P2 by 120° to the one side in the rotary direction. An angle P4 corresponding to the fourth combination is a position away from the angle P3 by 120° to the other side in the rotary direction. The angle P4 is a position away from the angle P1 by 120° to the one side in the rotary direction as well. In this case, every time the four combinations in the circuit are sequentially switched, the electrical angle moves to the angle P1 corresponding to the first combination. The electrical angle rotates by 120° to the one side in the rotary direction so as to move from the angle P1 to the angle P2 corresponding to the second combination through a path r2. The electrical angle rotates by 120° to the one side in the rotary direction so as to move from the angle P2 to the angle P3 corresponding to the third combination through a path r3. The electrical angle rotates by 120° to the other side in the rotary direction so as to move from the angle P3 to the angle P4 corresponding to the fourth combination through a path r4. Since a series of processing for examining the conduction state ends in a state where the electrical angle is at the angle P4, when the series of processing is repeatedly performed in succession, the angle P4 becomes an initial position from second processing executed by the opening and closing control unit 33 and the detection unit 32. In other words, the angle P4 can be referred to as an angle P0. The electrical angle rotates by 120° to the other side in the rotary direction so as to move from the angle P0 (P4) to the angle P1 corresponding to the first combination from the second processing through a path r1. The angle P4, that is, the angle P0 is the angle P2 as well. In this case, for example, if the fourth combination is not set and the series of processing ends so far as the third combination starting from the first combination, the electrical angle does not return to the original position. Thus, a difference occurs between the electrical angle at the time of starting the series of processing and the electrical angle at the time of ending the same. In such a case, when the series of processing is repeatedly performed in succession, for example, when the actuation operation is performed multiple times in the above-described application example applied to a vehicle, there is a possibility of an occurrence of accumulative changes in not only a mechanical angle, that is, an angle of the rotor which moves following after the electrical angle, but also a position, an angle, or the like of the movable section 2. In this regard, according to the embodiment, even in a case where the series of processing for examining the conduction state is repeatedly performed multiple times in succession, the electrical angle returns to the original position through the series of processing. Therefore, not only the mechanical angle, that is, the angle of the rotor, but also the position, the angle, or the like of the movable section 2 are prevented from accumulatively changing.

2. The combinations are set so as to cause all the three high-voltage side switching elements SH and the three low-voltage side switching elements SL to be included at least once in the four combinations each of which is formed with the high-voltage side switching element SH and the low-voltage side switching element SL. As described above, according to the three combinations each of which is formed with the high-voltage side switching element SH and the low-voltage side switching element SL, all the high-voltage side switching elements SH and all the low-voltage side switching elements SL can be examined. However, in the embodiment, since the four combinations are set as described in the case 1, the combinations may be set so as to cause all the high-voltage side switching elements SH and the low-voltage side switching element SL to be included at least once in the four combinations. For example, the four combinations each of which is formed with the high-voltage side switching element SH and the low-voltage side switching element SL satisfying the cases 1 and 2 are stored in a storage unit such as the ROM, the flash memory, or the like in the control device 30.

Here, with reference to FIGS. 3 to 7, descriptions will be given regarding combinations C1 to C4 each of which is formed with the closed high-voltage side switching element SH and the closed low-voltage side switching element SL in the series of processing for examining the conduction state, and specification examples of the electrical angles and the mechanical angles which can be obtained through the combinations C1 to C4. In this case, an application example applied to the motor 1 in which the output cable 23 of each phase is subjected to the delta connection will be described. In other words, a coil 1c illustrated in FIGS. 4 to 7 is provided between the output cable 23U in a U-layer and the output cable 23V in a V-layer, between the output cable 23V in the V-layer and the output cable 23W of a W-layer, and between the output cable 23W of the W-layer and the output cable 23U of the U-layer.

Figure 3:
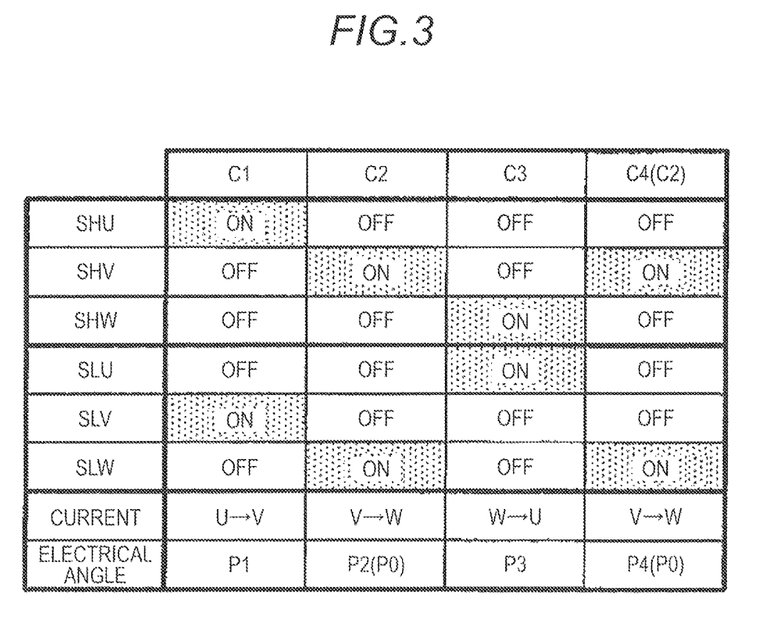
FIG. 3 is a table illustrating an example of a pattern of four combinations each of which is formed with a closed high-voltage side switching element and a closed low-voltage side switching element during the examination of the conduction state performed by the inverter apparatus according to the embodiment.

FIG. 3 illustrates an example of the four combinations satisfying the above-described cases 1 and 2. In FIG. 3, the closed switching element is marked as "ON", and the open switching element is marked as "OFF". In the first combination C1, the high-voltage side switching element SHU of the U-phase and the low-voltage side switching element SLV of the V-phase are closed. In the second combination C2, the high-voltage side switching element SHV of the V-phase and the low-voltage side switching element SLW of the W-phase are closed. In the third combination C3, the high-voltage side switching element SHW of the W-phase and the low-voltage side switching element SLU of the U-phase are closed. In the fourth combination C4, the high-voltage side switching element SHV of the V-phase and the low-voltage side switching element SLW of the W-phase are closed. As is clear from FIG. 3, the second combination C2 and the fourth combination C4 are the same.

Figure 4:
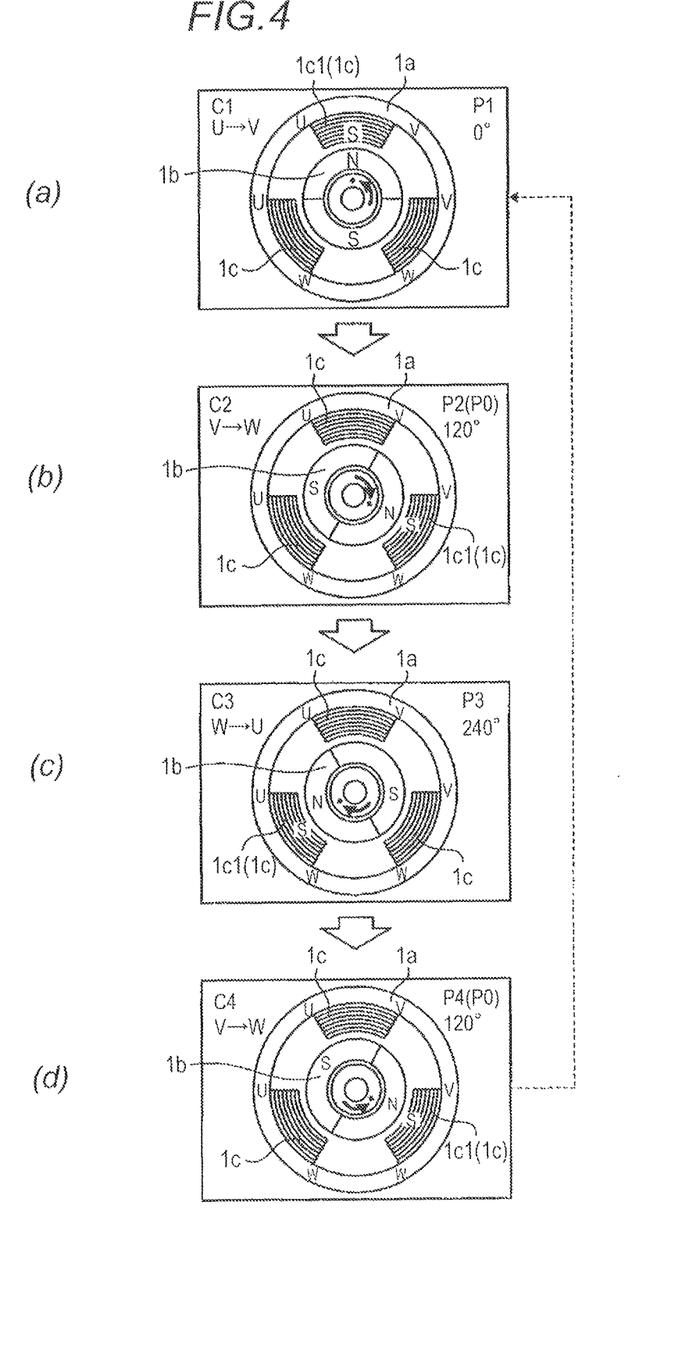
FIG. 4 is an explanatory diagram exemplifying changes in the electrical angle and a mechanical angle of the motor corresponding to each of the four combinations formed with the closed high-voltage side switching element and the closed low-voltage side switching element during the examination of the conduction state performed by the inverter apparatus according to the embodiment.

FIG. 4 respectively illustrates the electrical angles and the mechanical angles in the combinations C1 to C4. FIG. 4 schematically illustrates a rotor 1b, a stator 1a, and a coil 1c in a view from the rotary center in the axial direction. In FIG. 4, for example, 0° of the electrical angle and the mechanical angle is set in the direction of 12:00 so that the electrical angle and the mechanical angle increase clockwise.

A. Combination C1

In the first combination C1 in which the high-voltage side switching element SHU and the low-voltage side switching element SLV are closed and others are open, a current flows from the high-voltage side to the low-voltage side passing through the output cable 23U of the U-phase and the output cable 23V of the V-phase. In this case, a current flows in a coil 1c1 which is provided between the output cable 23U of the U-phase and the output cable 23V of the V-phase. Accordingly, the inner side of the coil 1c1 in a radial direction becomes the S pole, and the rotor 1b rotates to an angle facing the S pole. The electrical angle and the mechanical angle in this case are at the angle P1 (=0°).

B. Combination C2

In the second combination C2 in which the high-voltage side switching element SHV and the low-voltage side switching element SLW are closed and others are open, a current flows from the high-voltage side to the low-voltage side passing through the output cable 23V of the V-phase and the output cable 23W of the W-phase. In this case, a current flows in the coil 1c1 which is provided between the output cable 23V of the V-phase and the output cable 23W of the W-phase. Accordingly, the inner side of the coil 1c1 in the radial direction becomes the S pole, and the rotor 1*b* rotates to an angle facing the S pole. The electrical angle and the mechanical angle in this case are at the angle P2 (=120°).

C. Combination C3

In the third combination C3 in which the high-voltage side switching element SHW and the low-voltage side switching element SLU are closed and others are open, a current flows from the high-voltage side to the low-voltage side passing through the output cable 23W of the W-phase and the output cable 23U of the U-phase. In this case, a current flows in the coil 1*c*1 which is provided between the output cable 23W of the W-phase and the output cable 23U of the U-phase. Accordingly, the inner side of the coil 1*c*1 in the radial direction becomes the S pole, and the rotor 1*b* rotates to an angle facing the S pole. The electrical angle and the mechanical angle in this case are at the angle P3 (=240°).

D. Combination C4

As described above, the fourth combination C4 is the same as the combination C2. Therefore, a current flows from the high-voltage side to the low-voltage side passing through the output cable 23V of the V-phase and the output cable 23W of the W-phase. In this case, a current flows in the coil 1*c*1 which is provided between the output cable 23V of the V-phase and the output cable 23W of the W-phase. Accordingly, the inner side of the coil 1*c*1 in the radial direction becomes the S pole, and the rotor 1*b* rotates to an angle facing the S pole. The electrical angle and the mechanical angle in this case are at the angle P4 (=120°). The angle P4 is the same as the angle P2. Here, when the series of processing for examining the conduction state is repeatedly performed, a state where the electrical angle in the combination C4 is the angle P4 (P0) is shifted to a state where the electrical angle in the combination C1 is the angle P1.

The opening and closing control unit 33 controls opening and closing of the high-voltage side switching elements SH and the low-voltage side switching elements SL in the order of the combinations C1 to C4, and the detection unit 32 examines the conduction state of the circuit formed through each of the combinations C1 to C4, based on the detection result of the sensor 26.

Figure 5:
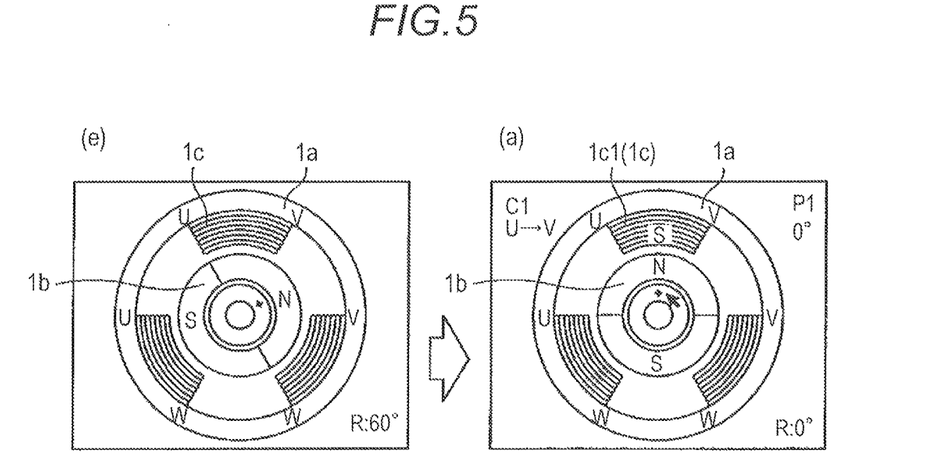
FIG. 5 is an explanatory diagram illustrating an example of a change in a rotary angle of a rotor at an initial stage in the examination of the conduction state performed by the inverter apparatus according to the embodiment.
Figure 6:
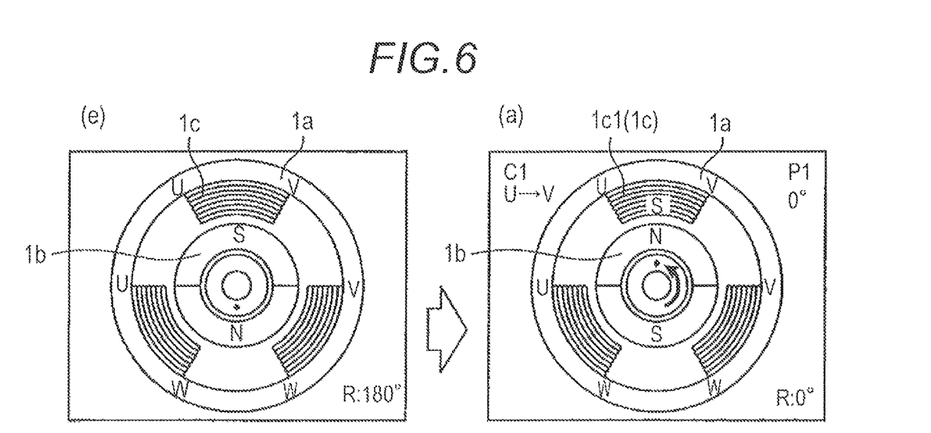
FIG. 6 is an explanatory diagram illustrating another example of the change in the rotary angle of the rotor at the initial stage in the examination of the conduction state performed by the inverter apparatus according to the embodiment.
Figure 7:
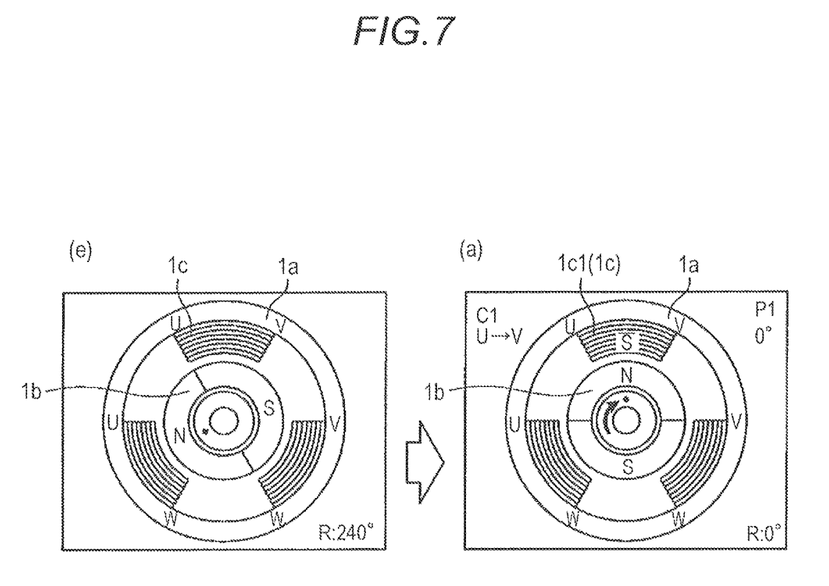
FIG. 7 is an explanatory diagram illustrating further another example of the change in the rotary angle of the rotor at the initial stage in the examination of the conduction state performed by the inverter apparatus according to the embodiment.

FIGS. 5 to 7 illustrate changes in the angle of the rotor 1*b* in the combination C1 in a case where the rotor 1*b* is not positioned at the angle P0 before the series of processing for examining the conduction state starts. As illustrated in FIGS. 5 to 7, regardless of which angle R the rotor 1*b* is positioned, the rotor 1*b* rotates until the rotor 1*b* is positioned at the angle corresponding to the electrical angle. Regarding the combinations C2 to C4 thereafter, the movement is carried out similar to that in FIG. 4. In FIGS. 5 to 7, cases where R=60°, 180°, and 240° are exemplified. However, in a case other than the angles thereof as well, the rotor 1*b* rotates until the rotor 1*b* is positioned at the angle R=0°, that is, the angle corresponding to that in the first combination C1. Accordingly, even though the angle of the rotor 1*b* is not positioned at the angle P0 at the initial stage, it is possible to obtain operations of FIGS. 2 and 4 by performing switching of the combinations C1 to C4.

As illustrated in FIG. 1, when the motor 1 is provided with a sensor 1*d* such as a Hall element which detects the rotary angle of the rotor 1*b*, and the control device 30 includes a rotary angle acquisition unit 34 which acquires the rotary angle of the rotor 1*b* based on the detection result of the sensor 1*d*, the opening and closing control unit 33 can determine the combinations C1 to C4 in accordance with the rotary angle of the rotor 1*b* acquired by the rotary angle acquisition unit 34, before performing the series of processing. For example, as illustrated in (e) of FIG. 6, when the angle R of the rotor 1*b* acquired by the rotary angle acquisition unit 34 prior to the series of processing is 180°, it is possible to determine the combinations C1 to C4 so as to cause the angles P0, P2, and P4 of the electrical angles to be at 180°, the angle P1 to be at 60°, and the angle P3 to be at 300°. For example, the storage unit of the control device 30 stores a plurality of patterns of the combinations C1 to C4 in accordance with the range of the rotary angle of the rotor 1*b* acquired by the rotary angle acquisition unit 34. Therefore, the opening and closing control unit 33 can determine the combinations C1 to C4 so as to cause a difference between the angles of the rotor 1*b* to be small before and after the series of processing, with reference to the patterns stored in the storage unit. Moreover, when the rotary angle of the rotor 1*b* acquired by the rotary angle acquisition unit 34 is deviated from the electrical angle which is settable in the motor 1, the opening and closing control unit 33 can determine the combinations C1 to C4 so as to cause the electrical angle (P4) after the series of processing to be an electrical angle which is closer than other settable electrical angles among the settable electrical angles or to be an electrical angle which has the smallest deviation with respect to the acquired rotary angle of the rotor 1*b*. Specifically, for example, when the rotary angle of the rotor 1*b* acquired by the rotary angle acquisition unit 34 is 200°, the opening and closing control unit 33 can determine the combinations C1 to C4 so as to cause the angles P0, P2, and P4 to be at 180°, the angle P1 to be at 60°, and the angle P3 to be at 300°.

As described hereinbefore, in the embodiment, for example, the opening and closing control unit 33 performs controlling so as to cause the electrical angle of the motor 1 to pass through the angle P0 corresponding to the first combination, to rotate twice by 120° each time to the one side in the rotary direction, and to rotate once by 120° to the other side in the rotary direction thereafter, by sequentially closing the four combinations C1 to C4 each of which is formed with one among the three high-voltage side switching elements SH and one among the three low-voltage side switching elements SL. In this case, all the three high-voltage side switching elements SH and the three low-voltage side switching elements SL are closed at least once in the four combinations C1 to C4. Moreover, the detection unit 32 detects the conduction state of the circuit including the closed high-voltage side switching element SH and the closed low-voltage side switching element SL. Therefore, according to the embodiment, for example, at the time when the series of processing for examining the conduction state ends, the electrical angle is positioned at the set angle. Thus, for example, it is possible to prevent not only misalignment of the angle of the rotor caused through the series of processing for examining the conduction state but also changes in the position or the angle of the movable section 2, changes in the relative position or the relative angle between the rotor and the movable section 2, and the like.

In the embodiment, for example, the rotary angle acquisition unit 34 may acquire the rotary angle of the rotor 1*b* of the motor 1, and the opening and closing control unit 33 may determine the four combinations C1 to C4 in accordance with the rotary angle of the rotor 1*b* acquired by the rotary angle acquisition unit 34. In this case, for example, it is possible to reduce misalignment of the angle of the rotor further before and after the series of processing. Thus, for example, it is possible to prevent changes in the position or the angle of the movable section 2 further, changes in the relative position or the relative angle between the rotor and the movable section 2, and the like.

An inverter apparatus according to an aspect of this disclosure includes, for example, an inverter that includes three high-voltage side switching elements and three low-voltage side switching elements respectively provided in three phases one by one, and drives a three-phase brushless motor; an opening and closing control unit that performs controlling so as to cause an electrical angle of the three-phase brushless motor to pass through an angle corresponding to a first combination, to rotate twice by 120° each time to one side in a rotary direction, and to rotate once by 120° to the other side in the rotary direction thereafter, by sequentially closing four combinations each of which is formed with one among the three high-voltage side switching elements and one among the three low-voltage side switching elements; and a detection unit that detects a conduction state of a circuit including the closed high-voltage side switching element and the closed low-voltage side switching element, in which all of the three high-voltage side switching elements and the three low-voltage side switching elements are closed at least once in the four combinations. Therefore, for example, misalignment of a rotary angle of a rotor is unlikely to occur before and after a series of processing for examining the conduction state.

The inverter apparatus according to the aspect of this disclosure, for example, may further include a rotary angle acquisition unit that acquires a rotary angle of a rotor of the three-phase brushless motor, in which the opening and closing control unit determines the four combinations in accordance with the acquired rotary angle of the rotor. Therefore, for example, since the four combinations are determined in accordance with the rotary angle of the rotor, misalignment of the rotary angle of the rotor is unlikely to occur before and after the series of processing for examining the conduction state.

The inverter apparatus according to the aspect of this disclosure, for example, may further include a storage unit that stores a plurality of patterns of the four combinations, in which the opening and closing control unit determines the four combinations so as to cause a difference between angles of the rotor to be small before and after detection of the conduction state, with reference to the patterns stored in the storage unit.

In the inverter apparatus according to the aspect of this disclosure, for example, when the rotary angle of the rotor acquired by the rotary angle acquisition unit is deviated from the electrical angle which is settable in the motor, the opening and closing control unit may determine the four combinations so as to cause the electrical angle after detection of the conduction state to be an electrical angle which is closer than other settable electrical angles among the settable electrical angles or to be an electrical angle which has the smallest deviation with respect to the acquired rotary angle of the rotor.

Hereinbefore, the embodiment disclosed here is exemplified. However, the above-described embodiment is an example, not intended to limit the scope of this disclosure. The embodiment can be executed in other various forms, and various types of omission, replacement, combinations, and changes can be made without departing from the gist of this disclosure. The configurations and the shapes in each example can be partially replaced and executed. The specifications of each of the configurations and the shapes (structure, type, direction, shape, size, length, width, thickness, height, number, disposition, position, material, and the like) can be appropriately changed and executed. For example, the combinations of the switching elements are not limited to the above-described embodiment and can be executed by performing various types of setting. For example, this disclosure can be applied to an inverter for a motor in a different type or structure such as a motor of star connection. The rotary direction, the rotary angle, and the like of the electrical angle and the mechanical angle can be set in various manners. This disclosure may also be applied to an inverter apparatus of a motor for other than a vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An inverter apparatus comprising:
    an inverter that includes three high-voltage side switching elements and three low-voltage side switching elements respectively provided in three phases one by one, and drives a three-phase brushless motor;
    an opening and closing control unit that performs controlling so as to cause an electrical angle of the three-phase brushless motor to be positioned at an electrical angle corresponding to a first combination comprising a first the high-voltage side switching element and a first low-voltage side switching element are each closed and the other high-voltage side switching elements and the other low-voltage side switching elements are each open, and the electrical angle of the three-phase brushless motor to rotate by 120° to one side in a rotary direction due to a second combination comprising a second high-voltage side switching element and a second low-voltage side switching element are each closed and the other high-voltage side switching elements and the other low-voltage side switching elements are open, the electrical angle of the three-phase brushless motor to rotate by 120° to the one side in the rotary direction due to a third combination comprising a third high-voltage side switching element and a third low-voltage side switching element are each closed and the other are high-voltage side switching elements and the other low-voltage side switching elements open, and the electrical angle of the three-phase brushless motor to rotate by 120° to the other side in the rotary direction due to a fourth combination which is the same as the second combination;
    a detection unit that detects a conduction state of a circuit including the closed high-voltage side switching element and the closed low-voltage side switching element when a detection result is equal to or less than a predetermined threshold value; and
    a rotary angle acquisition unit that acquires a rotary angle of a rotor of the three-phase brushless motor,
    wherein all the three high-voltage side switching elements and the three low-voltage side switching elements are closed at least once in the four combinations,
    wherein the opening and closing control unit determines the four combinations in accordance with the acquired rotary angle of the rotor, and
    wherein when the rotary angle of the rotor acquired by the rotary angle acquisition unit is deviated from one of the electrical angles which are settable in the motor, the opening and closing control unit determines the four combinations so as to cause the electrical angle after detection of the conduction state to be an electrical angle which is closer to the acquired rotary angle than the other settable electrical angles among the settable electrical angles or to be an electric angle which has the smallest deviation with respect to the acquired rotary angle of the rotor.

2. The inverter apparatus according to claim 1, further comprising:

a storage unit that stores a plurality of patterns of the four combinations, wherein a difference between one of the electrical angled and the rotary angle is small, with reference to the patterns stored in the storage unit, before and after detection of the conduction state.

\* \* \* \* \*